(12) United States Patent
Holmes

(10) Patent No.: US 6,538,818 B2
(45) Date of Patent: Mar. 25, 2003

(54) METHOD AND DEVICE FOR WAVELENGTH SWITCHING, WAVELENGTH DIVISION MULTIPLEXING, AND TIME DIVISION MULTIPLEXING

(75) Inventor: Richard B. Holmes, Cameron Park, CA (US)

(73) Assignee: General Nutronics, Inc., Cameron Park, CA (US)

(*) Notice: Subject to any disclaimer, the term of this patent is extended or adjusted under 35 U.S.C. 154(b) by 0 days.

(21) Appl. No.: 09/799,423

(22) Filed: Mar. 2, 2001

(65) Prior Publication Data

US 2002/0054418 A1 May 9, 2002

Related U.S. Application Data

(63) Continuation-in-part of application No. 09/716,196, filed on Nov. 17, 2000, which is a continuation-in-part of application No. 09/666,898, filed on Sep. 20, 2000.

(51) Int. Cl.⁷ .......................... G02B 27/10; H04J 14/00; H04B 10/20
(52) U.S. Cl. ...................... 359/618; 359/117; 359/118
(58) Field of Search ............................... 359/245, 250, 359/117, 118

(56) References Cited

U.S. PATENT DOCUMENTS

| | | | | |
|---|---|---|---|---|
| 5,317,445 A | * | 5/1994 | DeJule et al. | 349/196 |
| 5,677,778 A | * | 10/1997 | Kanterakis et al. | 359/117 |
| 5,943,150 A | * | 8/1999 | Deri et al. | 359/119 |
| 6,097,859 A | * | 8/2000 | Solgaard et al. | 385/17 |
| 6,356,679 B1 | * | 3/2002 | Kapany | 385/17 |
| 2002/0054418 A1 | * | 5/2001 | Holmes | 359/250 |

* cited by examiner

Primary Examiner—Ricky Mack
(74) Attorney, Agent, or Firm—Ian F. Burns

(57) ABSTRACT

This invention enables a plurality of switch elements, each capable of receiving and transmitting a specific wavelength of light, to exchange information and to multiplex temporally-encoded information in time from two or more of the local processors. The process is accomplished by the use of an intermediate plane that has one or more ports that can detect light over a broad band of wavelengths, and that can transmit light at one or more specific wavelengths back to the local processors. The ports may be used to transmit time multiplexed and/or wavelength multiplexed signals.

18 Claims, 11 Drawing Sheets

METHOD AND DEVICE FOR WAVELENGTH SWITCHING, WAVELENGTH DIVISION MULTIPLEXING, AND TIME DIVISION MULTIPLEXING

CROSS REFERENCES TO RELATED APPLICATIONS

This application is a continuation-in-part application of U.S. patent application Ser. No. 09/716,196, filed Nov. 17, 2000, Which is a continuation-in-part application of U.S. patent application Ser. No. 09/666,898, filed on Sep. 20, 2000, both of which are incorporated herein by reference.

BACKGROUND OF THE INVENTION

1. Field of Invention

The present invention relates to a wavelength division multiplexing and, more particularly, to an optical foreplane for performing wavelength switching, wavelength division multiplexing, and time division multiplexing.

2. Description of Related Art

Time division multiplexing and wavelength conversion functions are performed by prior art optical telecommunication switches. For example, U.S. Pat. No. 5,521,733 discloses an optical switch that utilizes wavelength multiplexing. Wavelength-demultiplexing is often performed with a grating, using a separate grating or regions of gratings for each fiber. Each wavelength of each fiber is then sent to a separate detector, where the optical signal is converted to an electronic signal. The signal is read in electronic form to determine its destination, and the signal is then directed, often at lower bandwidth and in parallel optical interconnections, to an output port where it is converted to the desired wavelength by a transmitter and sent out on the desired fiber.

This process is cumbersome for several reasons. First, massive electrical interconnection is needed between $N_i$ input fibers and $M_i$ input wavelengths to $N_o$ output fibers and $M_o$ output wavelengths, resulting in a cross-connection that involves $N_i \times M_i$ inputs and $N_o \times M_o$ outputs. In some applications, $N_{i,o}$ might be 12 or more, and $M_{i,o}$ might be 100 or more, resulting in an interconnection with 1200 input combinations ×1200 output combinations. Electronic cross-connects of these sizes are not now made and are at least an order of magnitude beyond what is now available.

Second, prior-art processes typically require the use of cable, printed-circuit board, or an optical backplane to transfer data to and from the central electronic crossbar. Because of the bandwidths required for the transfer, an optical backplane is currently the preferred means of performing this transfer of information, as currently implemented by, for example, Ciena, Inc. This entails a process of: (1) conversion of the electronic signal to an optical signal, and, via an optical backplane, transmitting the light to a central electronic cross-switch, (2) switching the electronic signals, (3) reconversion of the electronic signal back to light and passing the light again through a backplane to outgoing ports, and (4) electronic reformatting and transmission of the signal to a destination. This process requires six (6) conversions of optical to electronic or electronic to optical signals. Additionally, significant extra hardware is needed for every conversion. It should be noted that this means of switching can perform both wavelength conversion and time division multiplexing if the electronic cross-connect is endowed with means to combine electronic signals from different input ports to a common output port. This implementation can also perform broadcasting if so desired.

Another instance of prior art improves on this approach. In this alternative, the electronic cross-connect is replaced by an optical cross-connect, such as the Lambda-router produced by Lucent, Inc. In this device, the incoming light is wavelength-demultiplexed, and then wavelength-converted to the desired outgoing wavelength, and the light is then routed to the proper output fiber by a large optical cross-connect. This approach is advantageous because it requires only one conversion from optical to electronic and electronic to optical conversion, but requires a prohibitively large optical cross-connect, due to the effects of diffraction, when more than a few dozen fibers are used with eighty (80) or more wavelengths. This approach also has difficulty with broadcasting the signal, unless substantial electronic preprocessing is performed when the signal is in electronic form.

In view of the foregoing, there is a need in the art for a device that permits many thousands of fibers at many hundreds of wavelengths to be interconnected. It would also be advantageous, if the device could transfer information via multiple wavelengths of light, and allow broadcasting to be performed. Additionally, it would be advantageous to allow time division and wavelength division multiplexing to be performed using signals from disparate fibers.

SUMMARY OF INVENTION

Advantages of the Invention

An advantage of the present invention is that it is able to allow multiple autonomous processors to transfer information via multiple wavelengths of light.

Another advantage of the present invention is that it is able to allow multiple processors to multiplex respective optical signals in time.

A further advantage of the present invention is that it is able to eliminate the need for an optical backplane in a specific type of an optical switch, thereby eliminating costly material and complexity from the optical switch.

An additional advantage of the present invention is that it is able to eliminate the need for an optical backplane in more general optical switches that utilize multiple wavelengths.

Another advantage of the present invention is that it is able to provide optical delay and, hence, provide optical buffering in an optical switch.

These and other advantages of the present invention may be realized by reference to the remaining portions of the specification, claims, and abstract.

Brief Description of the Invention

The present invention includes an optical signal altering device that includes a plurality of optical signal carriers or fibers for communicating an optical signal. The fibers include at least one source and at least one target. The device also includes a plurality of switch elements for receiving an optical signal from a source and transmitting the optical signal to a target. Furthermore, the device includes at least one port adapted to receive an optical signal having a first wavelength from at least one first switch element and transmit an optical signal having a second wavelength.

The above description sets forth, rather broadly, the more important features of the present invention so that the detailed description of the preferred embodiment that follows may be better understood and contributions of the present invention to the art may be better appreciated. There are, of course, additional features of the invention that will be described below and will form the subject matter of claims. In this respect, before explaining at least one preferred embodiment of the invention in detail, it is to be understood that the invention is not limited in its application to the details of the construction and to the arrangement of the components set forth in the following description or as illustrated in the drawings. The invention is capable of other embodiments and of being practiced and carried out in various ways. Also, it is to be understood that the phraseology and terminology employed herein are for the purpose of description and should not be regarded as limiting.

DESCRIPTION OF THE PREFERRED EMBODIMENT

In the following detailed description of the preferred embodiments, reference is made to the accompanying drawings, which form a part of this application. The drawings show, by way of illustration, specific embodiments in which the invention may be practiced. It is to be understood that other embodiments may be utilized and structural changes may be made with out departing from the scope of the present invention.

Single Detector Switch Element

Figure 1:
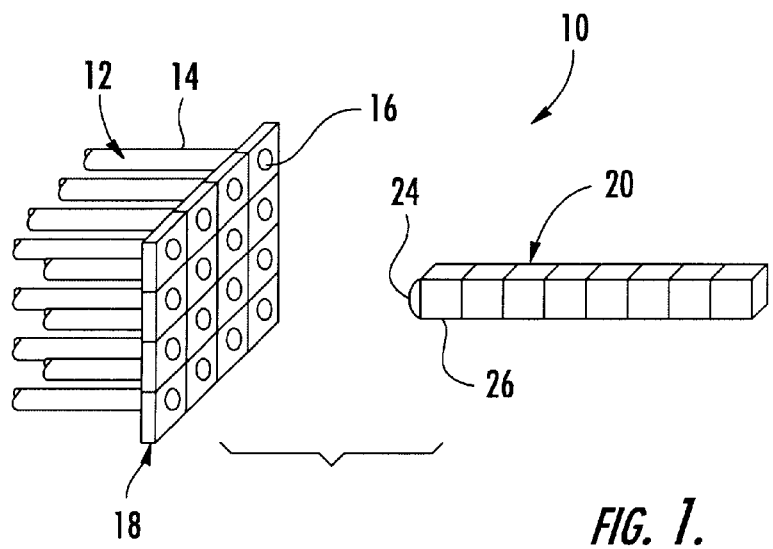
FIG. 1 is substantially a perspective schematic diagram of one switch device of the present invention.

As seen in FIG. 1, the present invention comprises a switch device generally indicated by reference number 10. Switch device 10 may be used in almost any optical communication system. Switch device 10 comprises sources and targets 12 and a switch array 20 of switch elements 26.

Sources and targets 12 comprise a source of incoming light signals and targets on to which switch array 20 transmits outgoing signals. The sources and targets may be the same or different devices or objects. Sources and targets 12 may include any number of fibers 14 and may use many different types of fibers. Each optical fiber 14 comprises an end 16. Ends 16 are preferably arranged in a two dimensional array, wherein the ends are substantially planar. It is recognized that array 18 may have many different configurations, such as the square array shown in FIG. 1.

Switch array 20 is provided with a lens 24. As will be discussed below, lenses 24 focuses light passing between array 18 and linear array 20. The focal length of lens 24 should equal the distance from ends 16 to the front of switch array 20.

Figure 2:
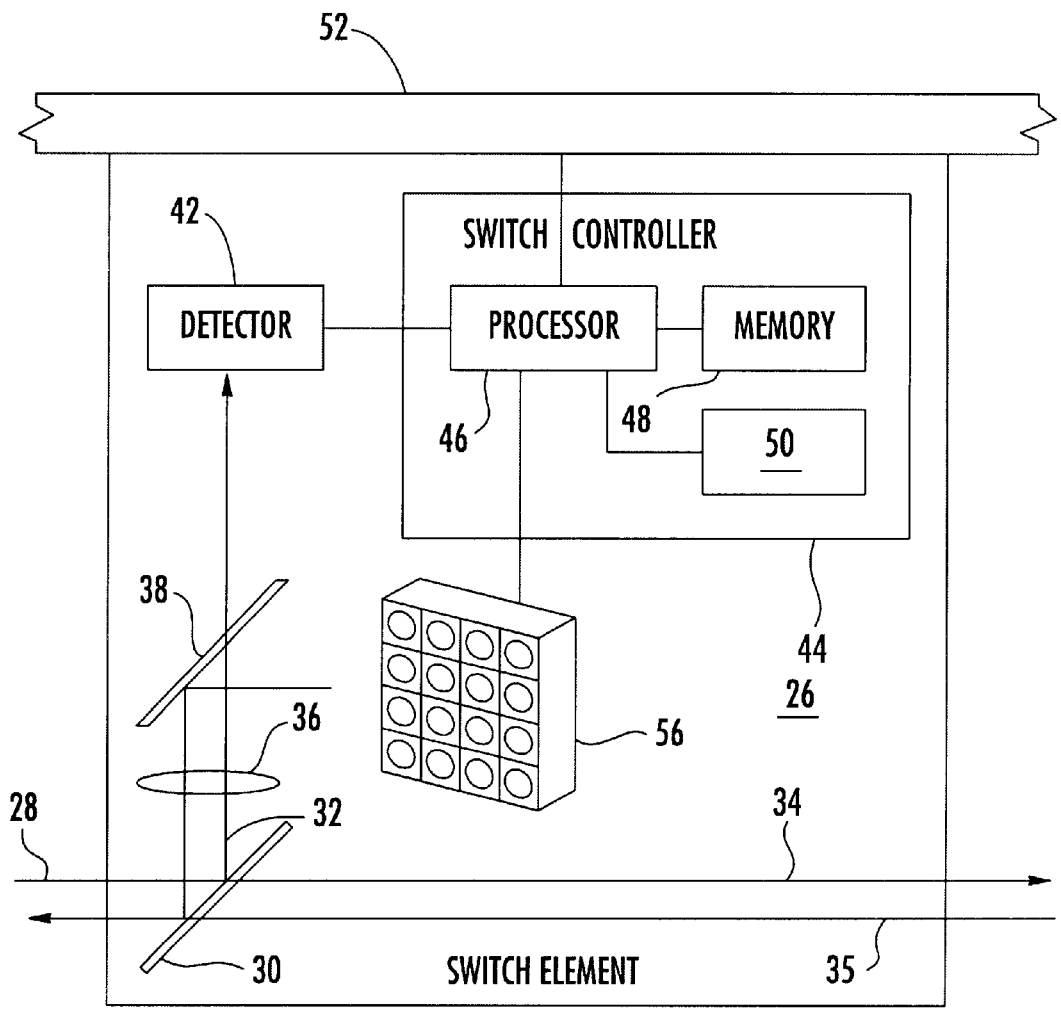
FIG. 2 is substantially a schematic diagram of one switch element of the present invention.
Figure 3:
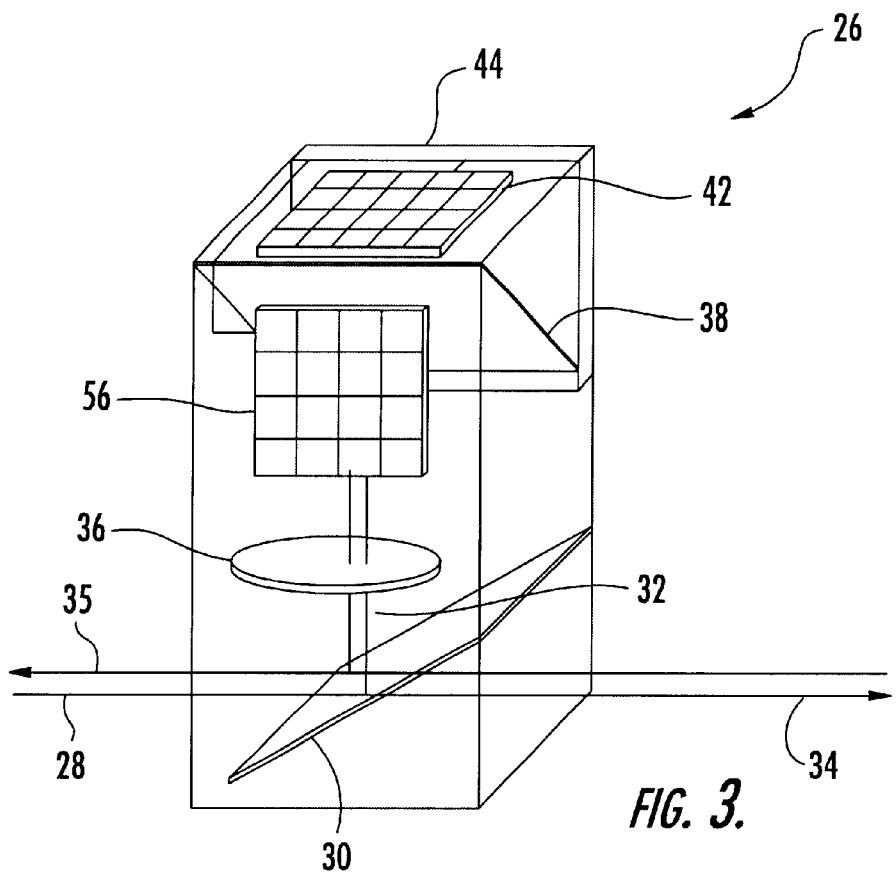
FIG. 3 is substantially a schematic diagram of one switch element of the present invention illustrating one possible configuration of its components.

Turning to FIGS. 2 and 3, each switch element 26 is arranged to receive incoming light 28 from an optical fiber 14 (not shown in FIGS. 2 and 3). As incoming light 28 enters switch element 26, it intersects beam splitter 30. Beam splitter 30 is a dichroic beam splitter that is adapted to reflect a predetermined wavelength or range of wavelengths of light 28. Beam splitter 30 may be model 03 BSC 23 or 03 BDL 005 available from Melles Griot, having an office in Irvine, Calif.

If incoming light 28 contains the predetermined wavelength that may be reflected by beam splitter 30, the beam splitter reflects that portion 32 of the light. Light that is not the predetermined wavelength will pass through beam splitter 30. This non-reflected light 34 may be transmitted to a second switch element (not shown in FIGS. 2 and 3) where it would it is subjected to another beam splitter (not shown). However, the beam splitter in the second switch element would be adapted to reflect light in another range of wavelengths and transmit light not in that range to another switch element. In this way, linear array 20 separates wavelength division multiplexed light signals into its individual signals.

As will be discussed below, each switch element may be capable of producing light signals. Light that is produced by other switch elements, outgoing light 35, is transmitted back along the path of incoming light 28. Since the outgoing light does not contain light in the range of wavelengths that is reflected by beam splitter 30, this light passes through the beam splitter and is transmitted out to the front of the switch array 20.

Reflected light 32 is directed through an optional focusing lens 36. In one embodiment, light 32 then falls on beam splitter 38. Beam splitter 38 allows light 32 to pass to detector array 42. Detector array 42 is adapted to detect signals in reflected light 32. Detector array 42 may generate electrical signals based on the light signals. Each detector in detector array 42 may be many different well known devices, such as 2609C Broadband Photodiode Module for both 1310 and 1550 nm detection available from Lucent Technologies or InGaAs p-i-n photodiodes for 1000–1700 nm detection, Part C30641E, available from EG&G. The electrical signals are transmitted to switch controller 44.

Switch controller 44 comprises a microprocessor 46 and memory 48. Microprocessor 46 is adapted to determine the intended destination of the light signal and route the signal to an appropriate fiber. Microprocessor 46 may be any of a number of devices that are well known in the art. For example, microprocessor 46 may be an Intel Pentium III, Conexant CX20462, or other similar processors. Memory 48 is preferably random access memory that also may be any of a number of devices that are well known in the art. Switch controller 44 may also comprise non-volatile memory 50 that may contain programming instructions for microprocessor 46.

Each light signal preferably carries a header that contains information that either identifies the signal or indicates its intended destination. Switch controller 44 is adapted to read the header. Switch controller 44 may be adapted, either alone or in coordination with other devices, to determine the destination of the light signal. A bus 52 may be provided to allow controller 44 to communicate with other devices and switch elements. Bus 52 may be connected to each switch element 26 and it allows each switch element to communicate with a central controller (not shown). For example, if a fiber has been disconnected from the network, the switch controller would need to be informed that this fiber is no longer available for transmission. In addition, device 10 may also be a node from which data is downloaded. In this application, it would be necessary for each switch element 26 to transmit data to another device to make use of the information.

When switch controller 44 sends a signal, it drives emitter array 56 to generate the signal. Emitter array 56 comprises a plurality of different areas or emitters arranged in a two-dimensional array, each area being adapted to independently transmit a light signal. Each individual emitter may be many different kinds of emitters that are suitable for the particular optical fiber system. For example, an individual emitter in the 1310 nm range may be a Daytona laser, model 1861A, available from Lucent Technologies. Emitter array 56 is adapted to produce light in the predetermined range of wavelengths that beam splitter 30 is intended to reflect. Array 56 is also adapted to generate signals in specific areas of the array so that the signal can be mapped on to the appropriate optical fiber or target. As the signal is generated, it is reflected by beam splitter 38 and passes through lens 36. The signal is then reflected by beam splitter 30 back along the path of the incoming light 28. When the signal reaches the front of the array, it is imaged by lens 24 on to array 18. The signal produced by a portion of emitter array 56 is then received by the corresponding optical fiber end 18 or other target. The focal length of lens 36 should be approximately equal to the optical path length from the center of emitter array 56 to the location of the imaging lens. In this way, each switch element can transmit a signal to any or all optical fibers 14 in sources and targets 12.

It is also recognized that a plurality of detector and emitter arrays may be used in one switch element to detect and emit a plurality of wavelengths. This would allow one switch element to perform the same function of a linear array of switch elements. Thus, the switch device of the present invention may comprise only a single switch element. The same result could be obtained by using single detector and emitter arrays that are adapted to detect and emit a plurality of wavelengths.

Figure 4:
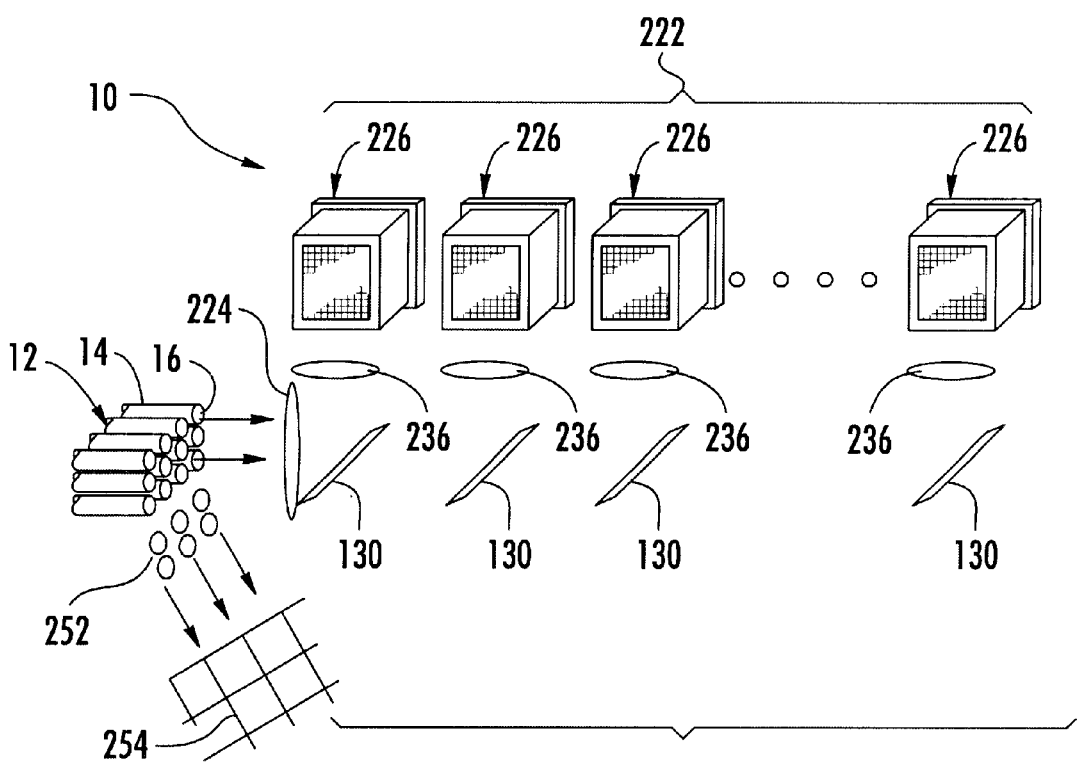
FIG. 4 is substantially a schematic diagram of another embodiment of the switch device of the present invention.

The embodiment disclosed in FIG. 4 utilizes a linear array 222 that is similar to linear array 20. However, each switch element 226 comprises a multi-focal lens 236 that is adapted to focus light differently depending upon the target of the light. This embodiment also includes mirrors 252 that can be used to direct the light to targets 254 without an optical waveguide. This embodiment is useful for applications where light is transmitted to targets over a distance of free space. For example, instead of installing optical fibers throughout an existing building, this embodiment of the present invention can be used to transmit signals to specific locations on the exterior of the building where a detector can receive the signal. An emitter associated with the detector can transmit signals to the device 10.

Single Source Emitter Switch Element

Figure 5:
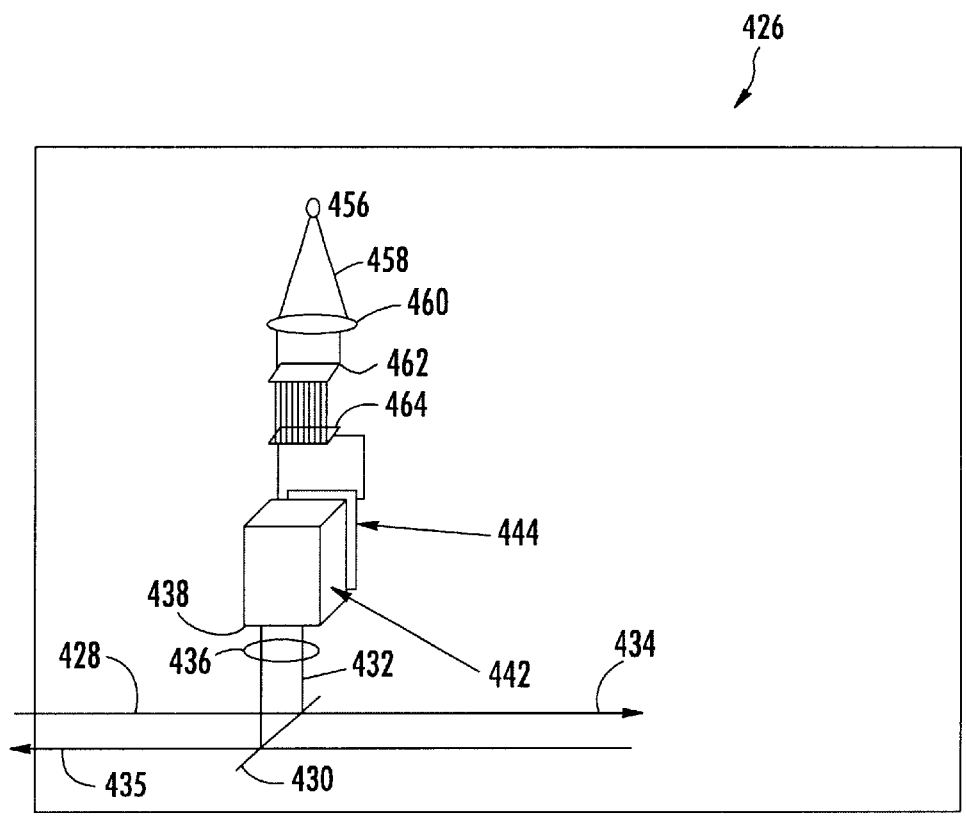
FIG. 5 is substantially a schematic diagram of another embodiment of the switch device of the present invention that utilizes a single source emitter.

As seen in FIG. 5, the present invention comprises an alternative embodiment generally indicated by reference number 426. Each switch element 426 is arranged to receive incoming light 428 from a source (not shown in FIG. 5). As incoming light 428 enters switch element 426, it intersects beam splitter 430. Similar to beam splitter 30, beam splitter 430 is a dichroic beam splitter that is adapted to reflect a predetermined wavelength or range of wavelengths of light.

If incoming light 428 contains the predetermined wavelength that may be reflected by beam splitter 430, the beam splitter reflects that portion 432 of the light. Light that is not the predetermined wavelength will pass through beam splitter 430. Similar to the first embodiment, the beam splitter in the second switch element would be adapted to reflect light in another range of wavelengths and transmit light not in that range to another switch element.

Light that is produced by other switch elements, outgoing light 435, is transmitted back along the path of incoming light 428.

Reflected light 432 is directed through an optional focusing lens 436. In this embodiment, light 432 then falls on beam splitter 438. Beam splitter 438 allows light 432 to pass to detector array 442. Detector array 442 is adapted to detect signals in reflected light 432 and, as mentioned above, detector array 442 is capable of distinguishing different signals that are being transmitted by different sources. Detector 442 may generate electrical signals based on the light signals. The electrical signals are transmitted to switch controller 444.

Switch controller 444 may be similar to switch controller 44 with a microprocessor and memory (not shown). The microprocessor is adapted to determine the intended destination of light signals and route the signals to an appropriate fiber. As in the previous embodiment, conflicts or interferences between signals can be handled within switch element 426.

Switch element also comprises an emitter 456 that is adapted to constantly transmit light 458 over a period of time. The light is produced in a desired range of wavelengths. Light 458 is transmitted to lens 460, which is adapted to collimate the light. Light 458 may then pass through optional lenslet array 462, which is adapted to concentrate the light on individual modulators in modulator array 464. The individual modulators in modulator array 464 may be modulators that are well known in the art, such as lithium niobate modulators available from Ortel in Azusa, Calif. Modulator array 464 is in communication with controller 444, which may drive individual modulators to allow light to pass through the array. The position of the individual modulators corresponds to the position of targets for the light 458.

By driving an individual modulator to allow light to pass through the modulator at selected times, the modulator can produce an optical signal. The signal passes through beam splitter 438 and lens 436 and is reflected by beam splitter 430 to a predetermined target.

Micro-electromechanical Mirrors Switch Element

The present invention also comprises an embodiment that utilizes micro- electromechanical mirrors (MEMs). MEMs are known in the art, an example of which has been produced by Lucent Technologies in Murray Hill, N.J. MEMs are mirrors that may be selectively positioned in a plurality of positions. This allows the MEMs to reflect light transmitted from a source to a plurality of locations or targets. A plurality of MEMs may be placed in an array to switch light from a plurality of sources.

Figure 6:
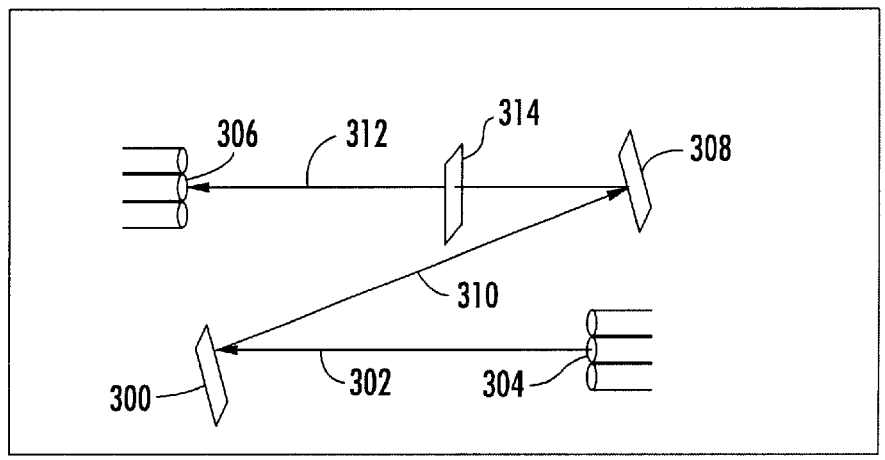
FIG. 6 is a schematic diagram of a prior art switch device that utilizes two micro-electromechanical mirrors.

As seen in FIG. 6, MEMs can be used to switch light spatially using what is called a "3D" or "beamsteering" approach. In this approach, a first MEMs array 300 is positioned to receive a plurality of incoming parallel light beams 302, sometimes called "pencil beams," from a source or sources 304. Before light falls on a particular MEM, the MEM is positioned or aimed to reflect light along a selected path. The path of the light corresponds to a location of a particular target 306 among a plurality of targets.

For some targets, such as an optical fiber, it is desirable that light being transmitted to the target be substantially parallel to the normal axis of the target. If first MEM array 300 were to reflect light directly to a target, it may cause the light to be non-parallel to the normal axis of the target. This is so because each MEM on array 300 may not be aligned with the intended target and it is necessary to reflect light at an angle relative to the path of the incoming light. To address this problem, a second MEM array 308 is provided. First MEM array reflects light 310 to a MEM on second MEM array 308. The particular MEM on second MEM array 308 is aligned with the axis of the desired target 306 and the MEM is positioned so that light reflected by it is parallel to the preferred axis of the target.

A lenslet array 314, which may comprise an array of lenses, may be provided between second MEM array 308 and target 306 to focus the light on the target. A controller may also be provided (not shown) for controlling the position of the individual MEMs in the MEM arrays.

The present invention comprises embodiments that utilize MEMs to switch optical signals. These embodiments utilize polarization of light signals to selectively reflect and transmit light. Polarization is a well-known property of light. There are two polarization states, typically denoted x and y, in which the electric field of the light oscillates in the x or y direction, respectively, as it propagates in the z direction. Such light is called linearly polarized x or y light, respectively.

Light of different polarizations can be superposed, i.e., added, so that states of polarization ax+by are possible. Furthermore, a and b can be complex; a complex part denotes a phase lag or lead between the two possible states. In particular, a polarization state x+iy, $i=(-1)^{1/2}$, corresponds to a polarization state that rotates in the positive angle sense as it propagates and therefore is called right-circularly polarized. The state x-iy corresponds to rotations of the electric field that rotates in the negative angle sense, and is called left-circularly polarized.

Light can be switched from one polarization state to another using $\lambda/2$ and $\lambda/4$ wave plates, which are well known to those skilled in the art. A $\lambda/4$ plate applies an additional factor of i (one-quarter of a full wave) to the y state, converting x+y to x+iy, or converting x+iy to x−y. Similarly, a $\lambda/2$ plate applies a factor of −1 (one half of a full wave) to the y component, converting x+y to x−y. These facts are used in the embodiments described below.

Additionally, it is well known to those skilled in the art that polarizing beam splitters can reflect one linear polarization, for example, x, and transmit the second linear polarization state, y. These devices may be used to reflect or transmit light depending on the polarization of the light.

Figure 7:
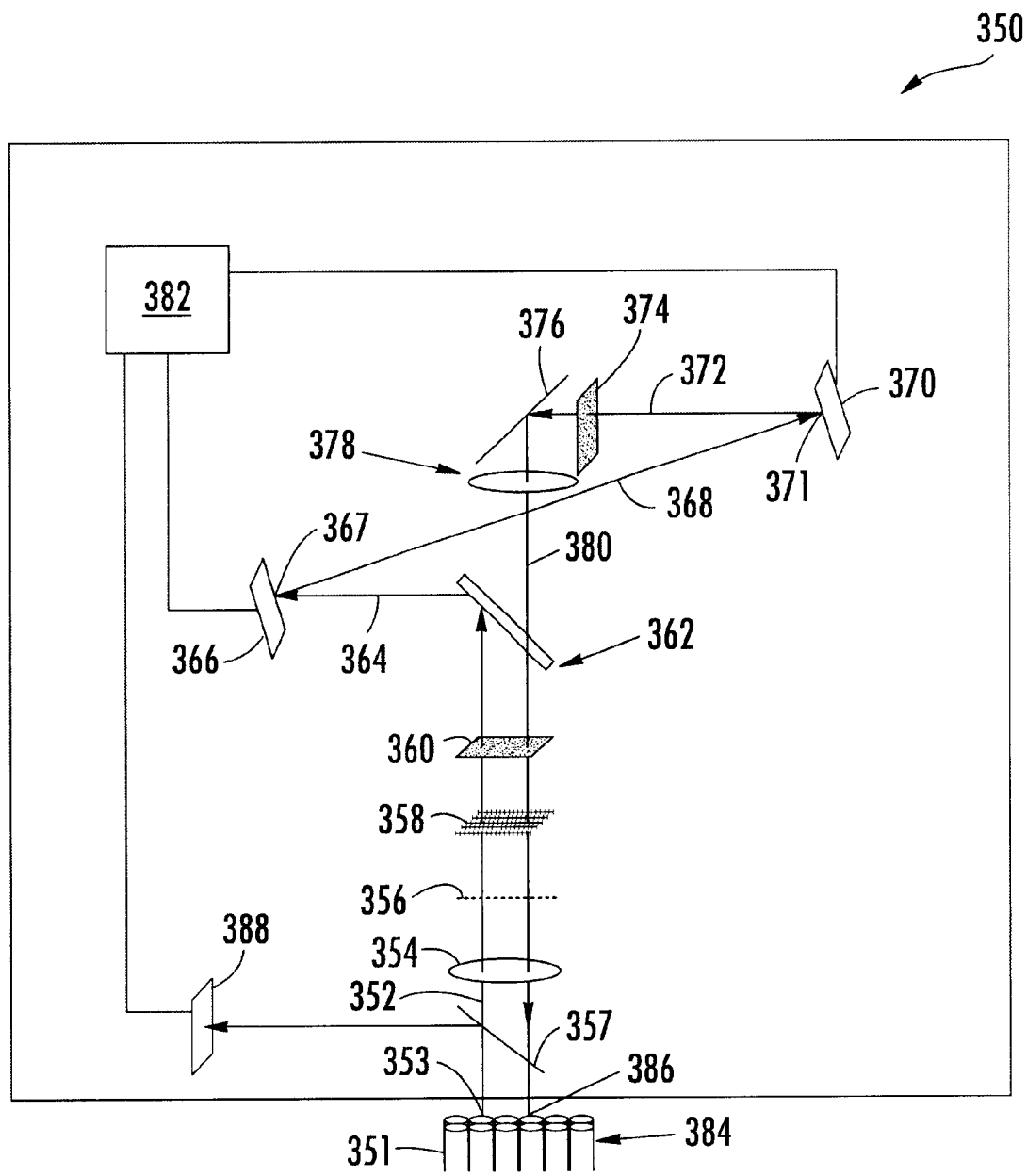
FIG. 7 is substantially a schematic diagram of another embodiment of the switch device of the present invention that utilizes two micro-electromechanical mirrors and two wave plates.
Figure 8:
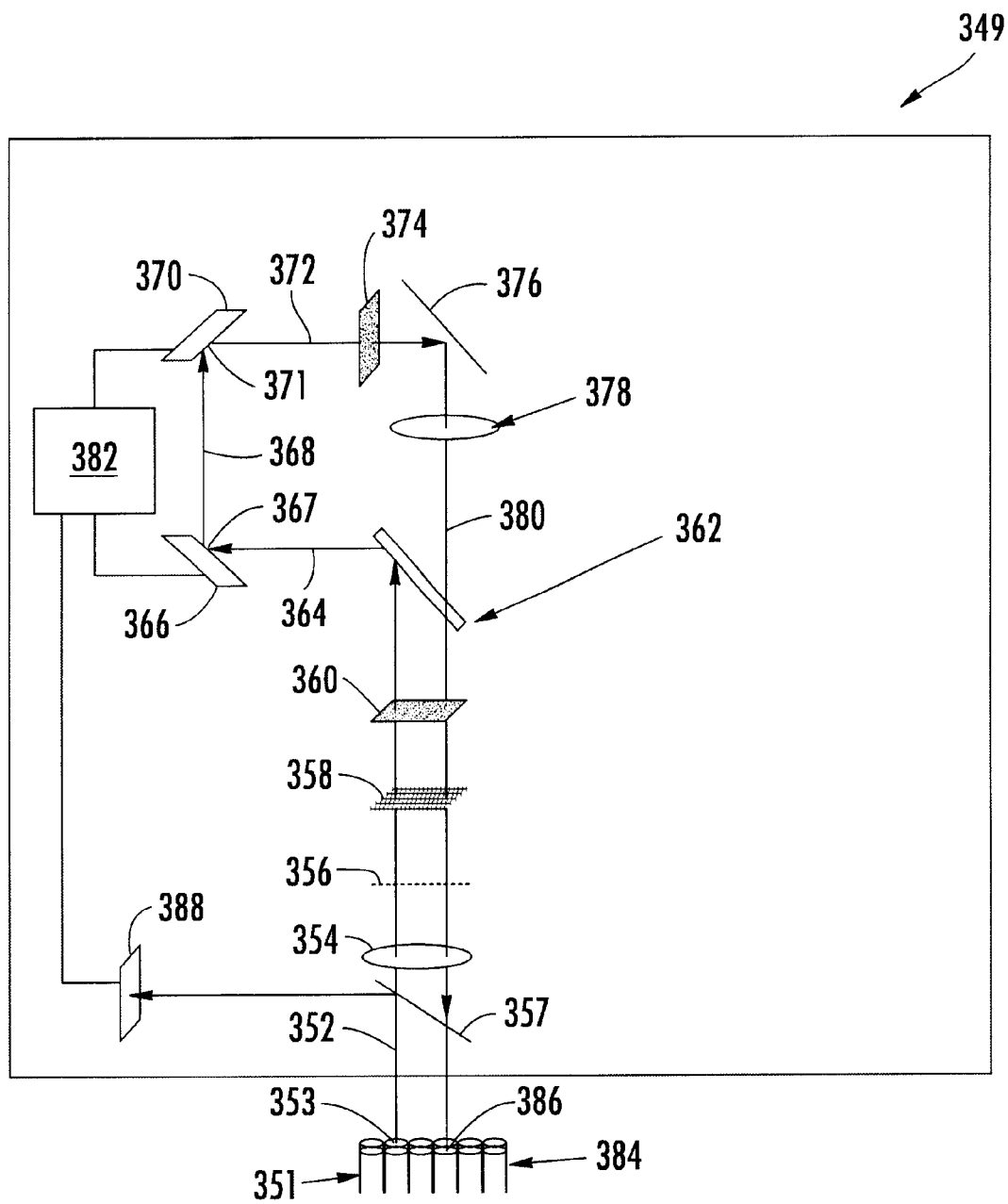
FIG. 8 is an alternate configuration of the embodiment illustrated in FIG. 7.

Turning now to FIG. 7, the present invention also comprises an alternative switch element generally indicated by reference number 350. Circularly polarized light 352 is transmitted by source 353. In the example calculations that follow, incoming light 352 is assumed to be right polarized light. Light 352 passes through lens 354, which focuses the light onto image plane 356. The light is allowed to diverge from the image plane until the light from the individual sources is of a size that matches the size of the individual micro-mirrors on MEMs array 366. Light 352 then passes through a lenslet array 358 that is adapted to collimate the light, i.e., make it into a "pencil beam" that neither diverges nor converges.

A beam splitter 357 may be provided in the path of incoming light 352 to reflect a portion of the incoming light to a detector array 388. Detector array 388 is adapted to convert the light signal to electrical signals and transmit the signals to controller 382. Controller 382, similar to controllers in the embodiments discussed above, is adapted to determine the destination of the incoming signal and drive MEM arrays 366 and 370 to route the signal to the appropriate target 386. As described above, each optical signal may be provided with a header that allows controller 382 to determine the destination of the signal. A gap may be provided between the header and the rest of the signal to provide sufficient time for controller 382 to determine the destination and drive particular MEMs in MEM arrays 366 and 370 to their desired angular positions.

After passing through lenslet array 358, light 352 passes through a $\lambda/4$ plate 360. This converts the right-circularly polarized light from a state x+iy to x−y. However, the state x−y is a purely linearly polarized state of light in a 45 degree direction, and will be denoted by x'. A properly oriented polarizing beam splitter 362 will then reflect the x'-polarized light to MEM array 366.

Reflected light 364 is transmitted to a particular MEM 367 that is aligned with the particular source 353 that emitted incoming light 352. MEM 367 is angularly positioned by controller 382 to reflect the light to a particular MEM 371 on MEM array 370. MEM 371 is aligned with a particular target 386 in a plurality of targets 384. It is recognized that targets 384 may be the same devices as sources 351. MEM 371 is angularly positioned by controller 382 to reflect incoming light 368 to target 386. The angular position of MEM 371 depends on the position of MEM 367 on MEM array 366. MEM arrays 366 and 370 are oriented so that the light passes through free space in this embodiment.

Reflected light 372 then passes through a $\lambda/2$ plate 374, which converts the polarization of the incident light from x'=x−y to y'=x+y, which is an orthogonal to x'. The light is then reflected by mirror 376. Reflected light 380 passes through lens 378, which acts to image the input lenslet array to the output lenslet array. Light 380 then passes through, if necessary, polarizing beam splitter 362. After passing through polarizing beam splitter 362 by virtue of its y' polarization, it then returns to the original $\lambda/4$ plate 360, which converts the y'=x+y polarized light to a polarization state x+iy, i.e., identical to the original input polarization state. Light 380 then exits the switching element the same way it came in, and proceeds to target 386.

Similar to the embodiment disclosed in FIG. 1, switch element 350 may be utilized in an array of switch elements (not shown in FIG. 7). A dichroic beam splitter may be provided between the switch element 350 and sources 351 to reflect light of a predetermined wavelength to the switch element and transmit light not in the predetermined wavelength to other switch elements.

Figure 9:
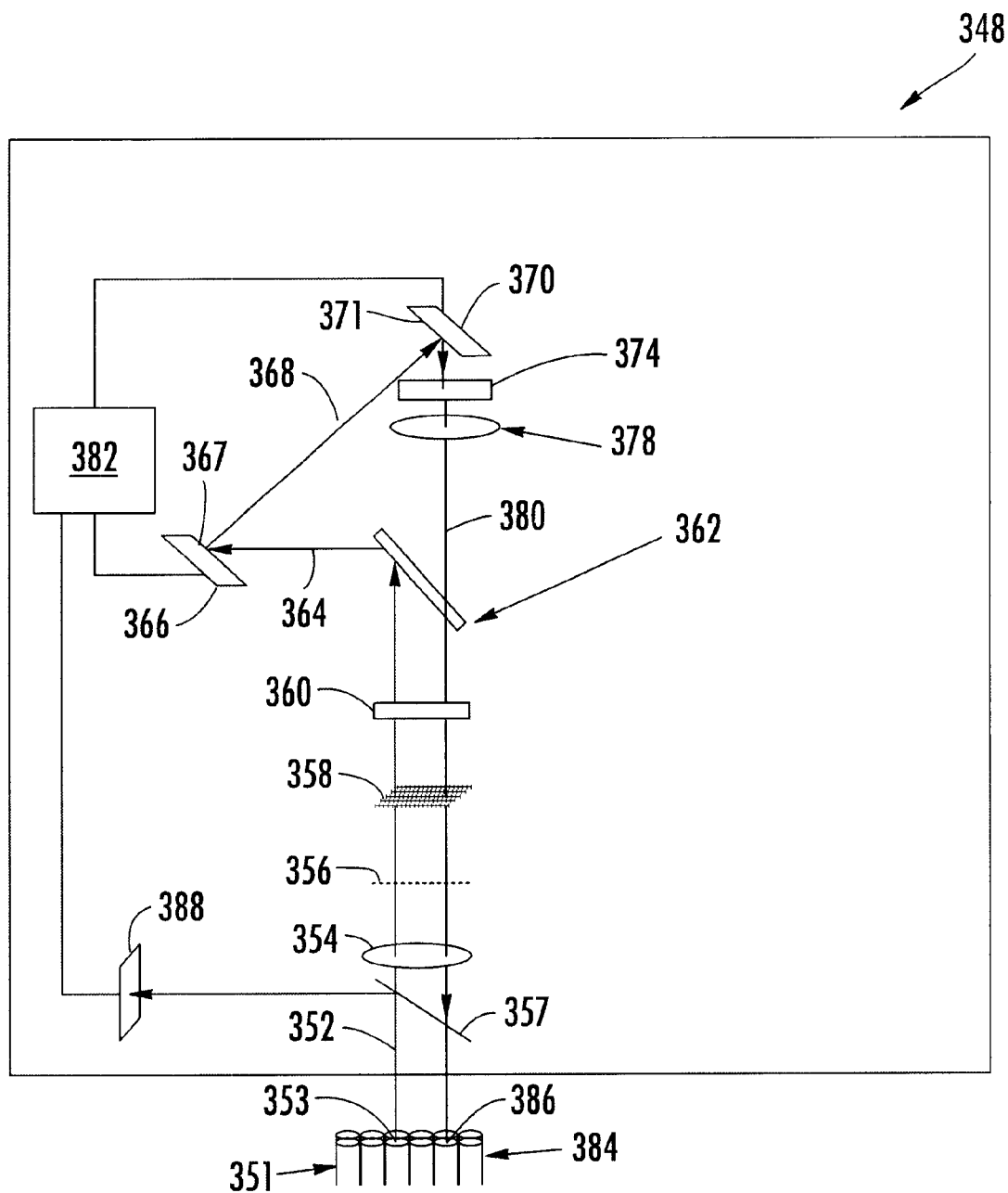
FIG. 9 is an another alternate configuration of the embodiment illustrated in FIG. 7.

In switch element 348 in FIG. 9, MEM array 370 is positioned in line with polarizing beam splitter 362 and targets 384. Thus, mirror 376 (seen in FIGS. 7 an 8) is not required.

Figure 10:
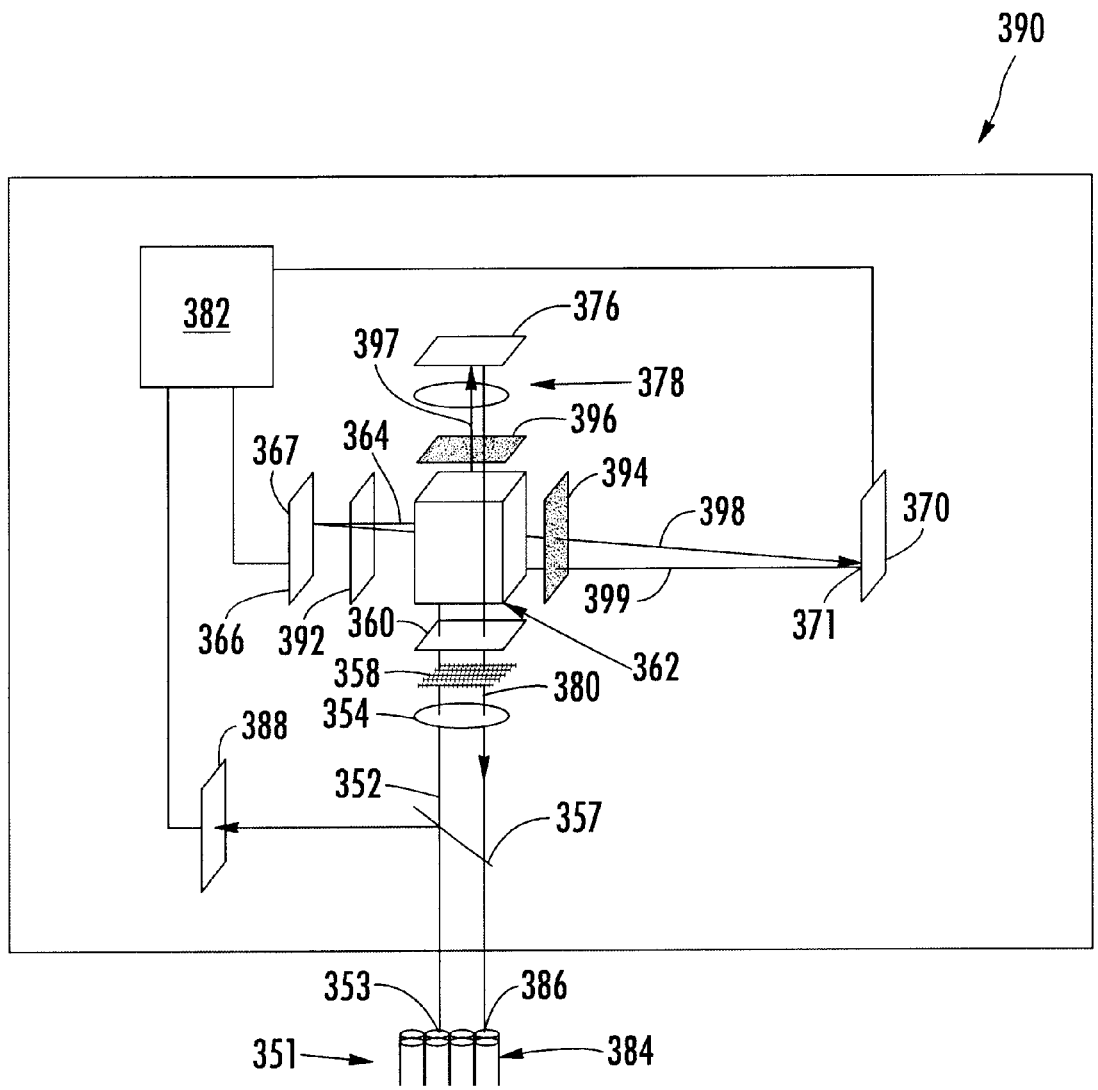
FIG. 10 is an alternate configuration of the embodiment illustrated in FIG. 7 that utilizes four wave plates.

FIG. 10 illustrates an embodiment that utilizes four λ/4 plates 360, 392, 394, and 396. Light 352 is focused, converted, reflected as described above. However, a λ/4 plate 392 between beam splitter 362 and MEM array 366 is used to convert the polarization state from x'=x−y to x−iy. Light 364 impinges on MEM array 366 as before and then propagates back through λ/4 plate 392, which then converts the polarization from x−iy to x+y=y'. Thus, light 398 becomes orthogonally polarized and passes through polarizing beam splitter 362 to MEM array 370.

Individual beams are directing the light in many different directions after being reflected by MEM array 366, and if these directions are larger than about 10 degrees from normal incidence at λ/4 plate 392 and at polarizing beam splitter 362, significant errors in the polarization state of the light may occur. Thus, reflection angles are limited in this embodiment to less than about 10 degrees from normal incidence.

After light 398 passes through polarizing beam splitter 362, the light passes through a third λ/4 plate 394 that converts the polarization state from y'=x+y to x+iy. The light 398 then proceeds to MEM array 370, which performs the same functions as in the previous embodiments. Reflected light 399 passes through the third λ/4 plate 394 where its polarization state is changed from x+iy to x'=x−y.

By virtue of this new polarization state, the light is now reflected by the polarizing beam splitter upwards towards a fourth λ/4 plate 396 that converts the polarization state from x'=x−y to x−iy. Light 397 then passes through lens 378, reflects from mirror 376 back through the lens. Lens 378 focal length is chosen so that the double transmission of the light results in imaging lens let array 358 onto itself, similar to what was done in the embodiment shown in FIG. 7.

Light is again incident on fourth λ/4 plate 396, which now converts the polarization state from x−iy to y'=x+y. By virtue of this new polarization state, light 380 transmits through polarizing beam splitter 362 and then passes out switching element 390 in the same manner as described in the previous embodiment.

Figure 11:
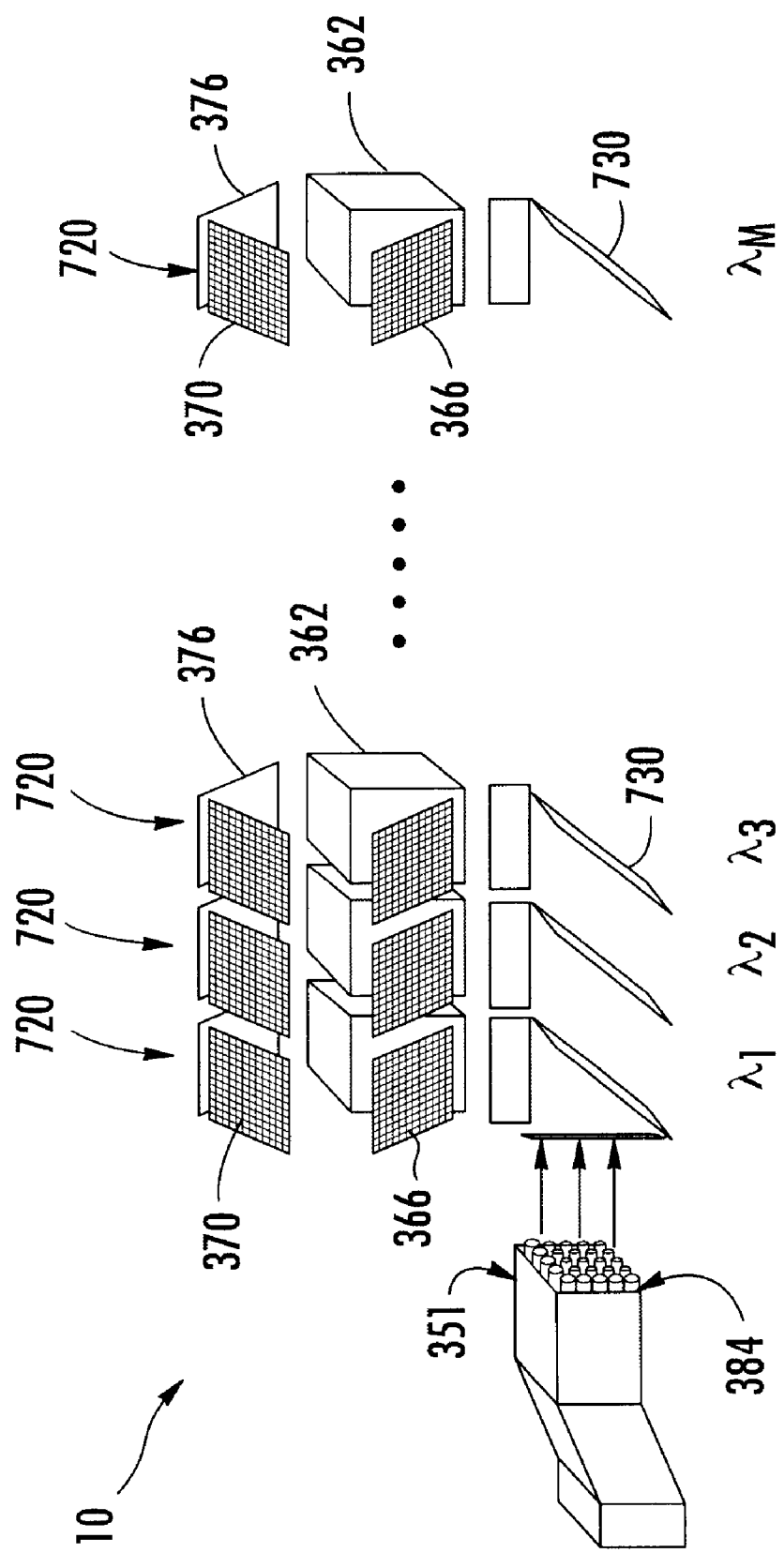
FIG. 11 is substantially a schematic diagram of another embodiment of the switch device of the present invention.

FIG. 11 discloses a switch device 10 that comprises a linear array of switch elements 720 for switching light between sources 351 and targets 384. Switch elements 720 may be similar to any of the MEM embodiments discussed above, which comprise MEM arrays 366 and 370, polarizing beam splitters 362, and mirror 376. Each switch element 720 further comprises a dichroic beam splitter 730 for reflecting light to the individual switch elements in the manner discussed above.

Wavelength Switching, Time Division Multiplexing, and Wavelength Division Multiplexing The present invention also comprises an embodiment that utilizes a port capable of wavelength switching, wavelength division multiplexing, and time division multiplexing of optical signals within the architectures of the embodiments discussed above. For convenience of explanation, the description of the port will be made with reference to the embodiments in FIGS. 2–5, which do not use micro-mirrors. However, one with skill in the art will recognize that the port is equally applicable to any of the embodiments of the switch element.

Figure 12:
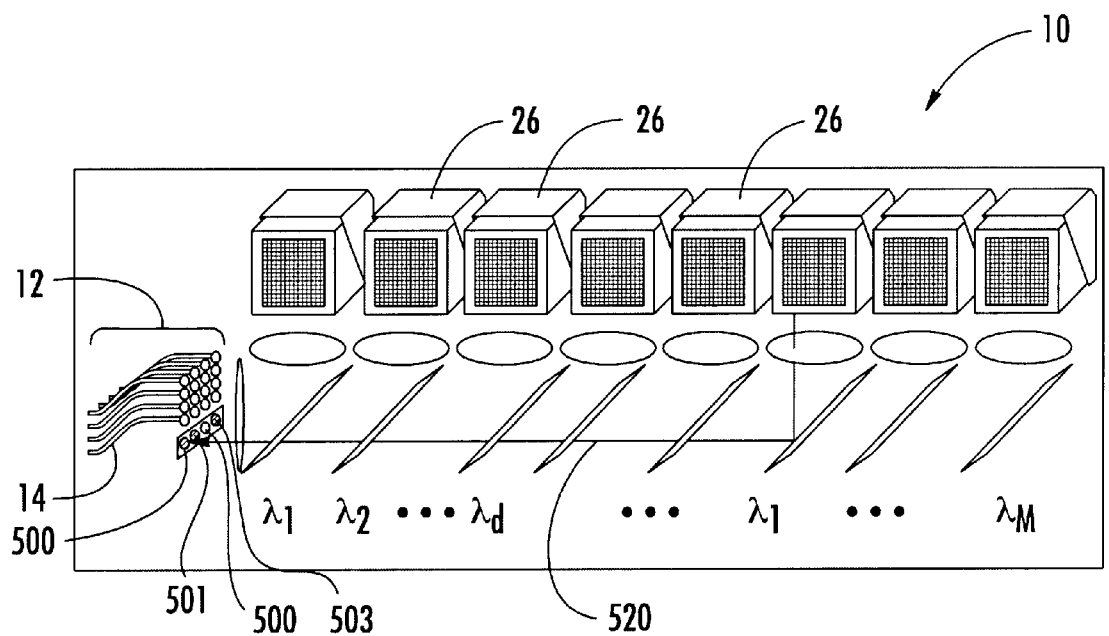
FIG. 12 is substantially a schematic diagram of another embodiment of the present invention that utilizes a port for wavelength switching, time multiplexing, and wavelength division multiplexing.
Figure 13:
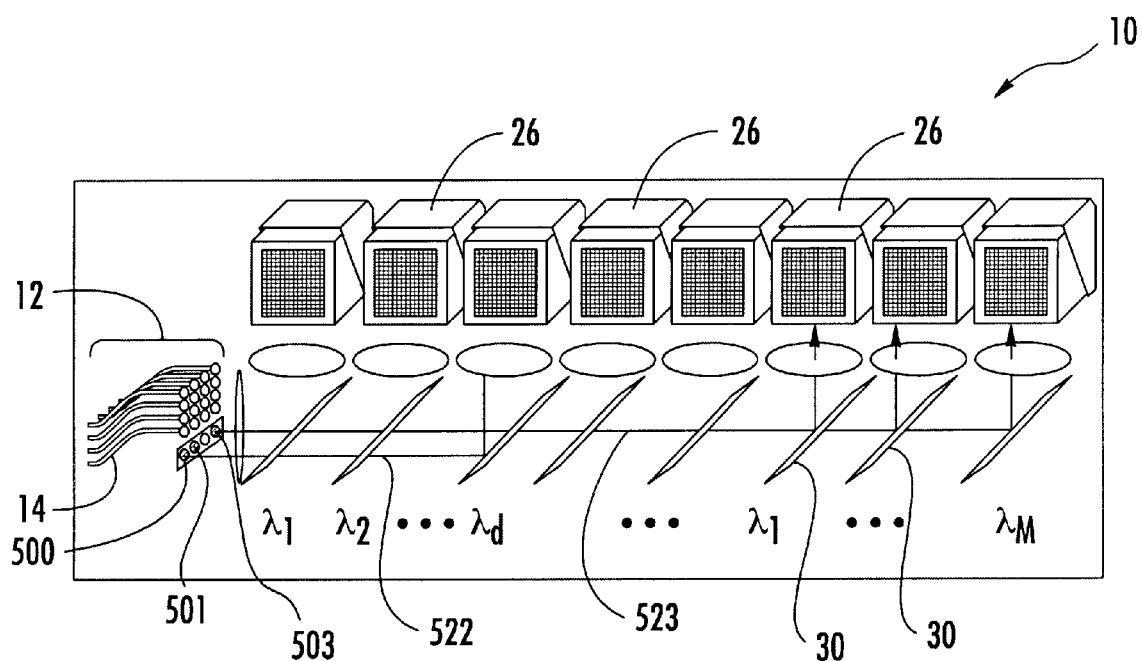
FIG. 13 is substantially a schematic diagram of the embodiment illustrated in FIG. 12 with an optical signal being transmitted.

Referring to FIGS. 12 and 13, the present invention comprises an optical foreplane 501 that is adapted to transfer data between processors 44. Optical foreplane 501 comprises at least one port 500. Port 500 is positioned to send and receive optical signals from switch elements 26.

Figure 14:
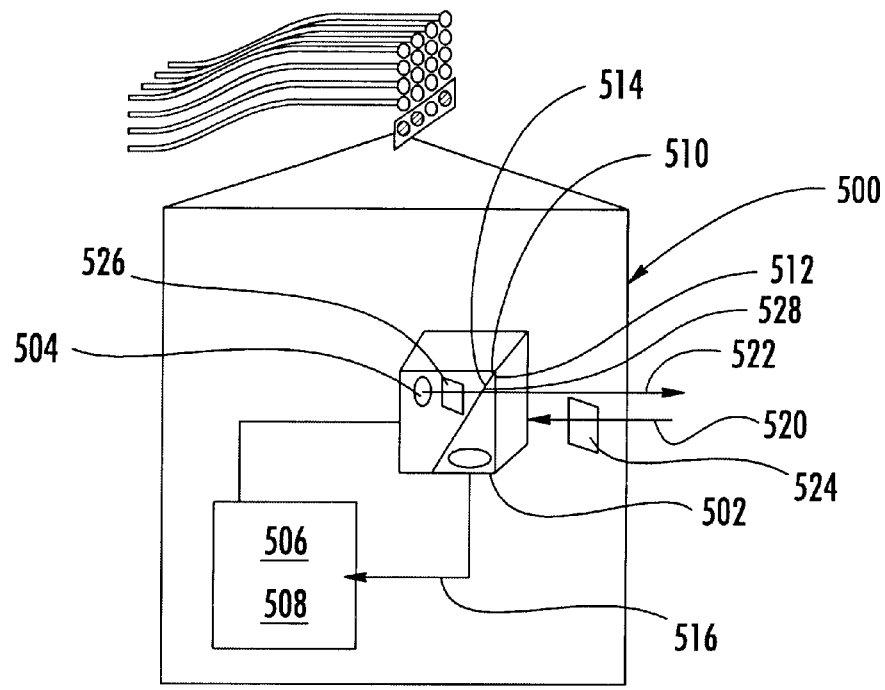
FIG. 14 is substantially a schematic diagram of a port of the present invention.

As seen in FIG. 14, port 500 comprises a detector 502, an emitter 504, and a beam splitter 510, which is preferably a polarizing beam splitter. Beam splitter 510 is adapted to reflect optical signal 520 (seen in FIG. 12) from an emitter array in one of switching elements 26 toward detector 502. Detector 502 is preferably on a reflective side 512 of beam splitter 510 because of the coarse tolerances required to reflect signal 520 onto detector 502. Emitter 504 is preferably on a transmissive side 514 of beam splitter 510 for ease of alignment. In an alternative embodiment, however, emitter 504 and detector 502 are positioned coplanar and an additional fold flat may be used on reflective side 512 of beam splitter 510 to direct a signal to detector 502. This alternative embodiment may be more easily manufactured.

As shown in FIG. 12, an optical signal 520 is transmitted by switch element 26 in a predetermined range of wavelengths. As discussed above, each switch element 26 may transmit light in a predetermined range of wavelengths, e.g., $\lambda_1$ to $\lambda_M$. In a preferred embodiment, detector 502 has substantial detection capabilities at all of the M wavelength bands shown in the preferred embodiments, i.e., $\lambda_1$ to $\lambda_M$. However, a detector 502 of a particular port 500 may be set to detect optical signals having a predetermined range of wavelengths, e.g., $\lambda_1$ to $\lambda_3$. In this case, each port 500 may be set to handle different ranges of wavelengths. Furthermore, in another alternative embodiment, detector 502 has substantial detection capability at only one of the wavelength bands shown, which might have use for reducing crosstalk. In this case, one or more ports 500 may be provided for each of the M wavelengths, and each emitter 504 at each port 500 may be tuned to a specific fixed wavelength $\lambda_i$ to $\lambda_M$, corresponding to one of the M wavelength bands present in the system. These individual wavelength ports 500 can then receive signals from one or more of switching elements 26, and send the signal to the individual switching element corresponding to its emitting wavelength. This latter alternative is advantageous when a tunable emitter source is unavailable, or when a broadband detector is not available. Detector 502 may be a type readily available from companies such as Sensors Unlimited, based in New Jersey.

Returning to FIG. 14, an output 516 of detector 502 is connected to an amplifier 506 and a driver for emitter 504. In one preferred embodiment, amplifier 506 is a trasimpedance amplifier. Amplifier 506 and driver 508 are capable of altering the wavelength of received optical signal 520. In addition, as will be described in more detail below, amplifier 506 and driver 508 are also capable of multiplexing optical signals in terms of wavelength and time. Emitter 504 then transits an optical signal 522 at a different wavelength, e.g., $\lambda_d$, tan the wavelenthg of the incoming optical signal 520. In an alternative embodiment, emitter 504 can emit at more than one of the wavelength bands at once, allowing signals to be broadcast via multiple wavelengths.

Next, optical signal 522, as shown in FIG. 13, is transmitted back to another switch element 26 as controlled by beam splitters 30, which operate in the manner discussed. The receiving switch element then transmits the signal towards an appropriate target. Emitter 504 may be manufactured by companies such as Bandwidth 9 in San Jose, Calif. , or by Lucent in Cherry Hill, N.J. In the preferred embodiment, the emitter wavelength can be fixed by the design of emitter 504. In one alternative embodiment, however, port 500 may comprise a wavelength-tunable laser that can be tuned to a selected wavelength as needed. This might be useful for handling heavy data loads at one specific wavelength.

Returning once again to FIG. 14, optical signal 520 entering port 500 is assumed to be linearly polarized. However, if the incoming signal 520 is in the wrong polarization state, a partial wave plate 524 may be used to alter signal 520 to the polarization needed for detection. Additionally, a polarizer 526 may be used between beam splitter 510 and emitter 504 to ensure that incoming signal 520 does not leak into emitter 504 and to minimize potential leakage from emitter 504 to detector 502. In order to minimize stray light in this design, the side of beam splitter 510 opposite that of detector 502 is also preferably treated with an angled or cone-or- spiral-shaped, blackened, diffuse surface 528 to minimize ghosting.

Figure 15:
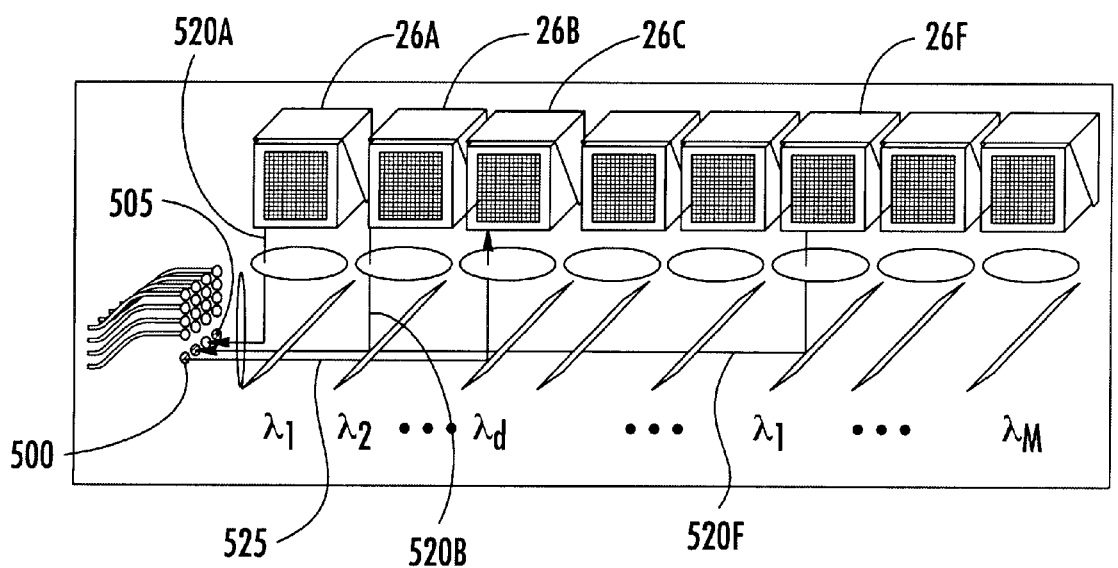
FIG. 15 is substantially a schematic diagram of the present invention illustrating time multiplexing of optical signals using a port.

As shown in FIG. 15, in addition to wavelength conversion, a particular port 500 of optical foreplane 501 may also enable optical time division multiplexing of signals from different wavelength bands. One need merely send signals, e.g., 520A, 520B, 520F, from two or more switching elements 26A, 26B, 26F at the associated wavelengths to the same port 500, and they will automatically be time-division multiplexed by detector 504, amplifier 506, and driver 508 and transmitted at a desired wavelength, e.g., $\lambda_d$, by emitter 502. For instance, transmitting optical signals 520A, 520B, 520F, at wavelengths $\lambda_1$, $\lambda_2$, $\lambda_i$, respectively, at different times from switching elements 26A, 26B, 26F, and combining these signals into an optical signal 525 at wavelength $\lambda_d$, which is directed to switching element 26C.

In order for the time division multiplexing to occur with reasonable quality, a reasonably constant detection capability over the range of wavelengths at port detectors 502 is needed Additionally, optical signals 520 from switching elements 26 (i.e., autonomous processors) must be synchronized in time. This can be accomplished with two additional calibration procedures. The first procedure is to use one or more of ports 500 to send a strobe pulse to all switching elements 26, 426, simultaneously. This strobe pulse sends a train of uniformly spaced short pulses that will provide a reference time to all switching elements 26. The pulse duration of the strobe pulse is preferably less than ⅕ of the duration of the shortest data pulses to ascertain the relative timing to a fraction of the data pulse and to avoid interfering with data The pulse repetition rate of the strobe pulse should be so slow that there is no ambiguity as to which pulse is received at all switching elements 26.

The second calibration procedure that is required obtains time-of-flight offsets of the individual switching elements 26. These time offsets $t_i$ are easily obtainable from a pulse that is transmitted from switching element 26 to a special retroreflecting port 505 (FIG. 15). Retroreflecting port 505 is readily available from vendors such as Newport Optics. The desired time offset is equal to the recorded time of return of the retroreflected signal at the respective switching element 26, $t_{ir}$, minus the known latencies in switching element detector relative to switching element emitter, $t_{de}$. If the time of arrival of a particular strobe pulse is $t_s$, the desired transmission offset time for optical time demultiplexing is then equal to $t_s - (t_{ir} - t_{de})/2$.

Returning to FIGS. 12 and 13, a particular port 503 in accordance with the above-described preferred embodiment may also be capable of wavelength division demultiplexing a ingle wavelength optical signal 520 by transmitting more than one wavelength optical signal 523 from emitter 502. Optical signal 523 may then be parsed by beam splitters 30, as described above, to appropriate switching elements 26, with each switching element 26 associated with a definite wavelength or subset of usable wavelengths Similarly, referring to FIG. 15, a combination of optical signals 520A–C having different wavelengths may be multiplexed into an optical signal having a single wavelength 522 by a port 500.

In one alternative embodiment, a fiber 14 may be used to transfer an optical signal from the face of the fiber bundle 12 to a remote port (not shown). This particular implementation has advantages when it is difficult to pack a detector and emitter into the fiber array. In yet another embodiment, the length of fiber 14 mentioned immediately above is set to provide an optical delay or an optical data buffer. Clearly, the alternative embodiments discussed herein can be used in conjunction with each other or with various aspects of the preferred embodiment.

The embodiment described above requires just one optical to electronic and electronic to optical conversion, if optical interconnections are made at each wavelength using a micro-mirror array for each wavelength. If interconnections are made using detectors and emitters at each wavelength then three optical to electronic and electronic to optical conversions are required. The statements of this paragraph apply for both wavelength shifting and for time-division multiplexing.

Figure 16:
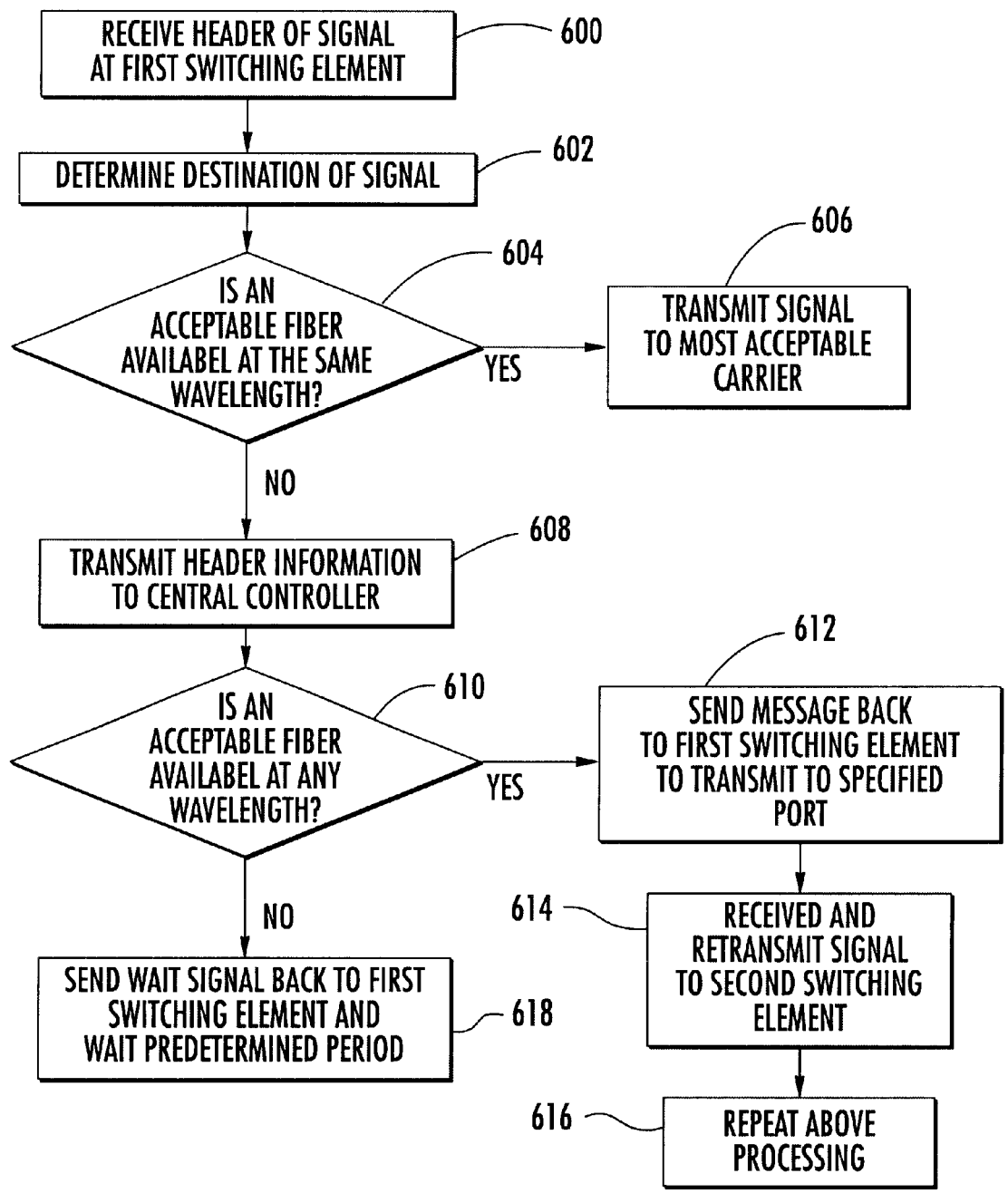
FIG. 16 is substantially a flow chart of operation of the present invention with regard to usage of the ports of the present invention.

Turning to FIG. 16, a preferred embodiment of the processing for the above-described wavelength switching, time division multiplexing, and wavelength division multiplexing will now be described. In a first step 600, a header of an optical signal is received at a first switching element, e.g., 26A. The first switch element determines the desired destination target of the signal 602. If one or more fibers 14 are available (step 604) at the same wavelength in which the first switch element is adapted to transmit in, the signal is transmitted to the most acceptable fiber 14, at step 606. Fiber availability may be determined at step 604, for instance, using a destination registry as described in the following Table 1:

TABLE 1

Destination Registry

| Destination | Preferred Fiber | Next Preferred Fiber | ... |
|---|---|---|---|
| 1 | A | E | . |
| 2 | F | B | . |
| 3 | C | D | . |
| . | . | . | . |
| . | . | . | . |

If all potential fibers 14 for the desired destination are unavailable at the subject wavelength, then the header information is passed to a central controller, as shown at step 608. Other information may be passed to the central controller, such as the size of the signal, the wavelength of the signal, wavelengths of the switch element capable of transmitting, etc.

Next, at step 610, central controller 54 determines if any combination of wavelength or fiber is available for transmission to the desired destination, using the destination registry, Table 1, and a wavelength availability (transmission) registry, as described in the following Table 2:

TABLE 2

Transmission Registry

| Fiber | Wavelength 1 | Wavelength 2 | . |
|-------|--------------|--------------|---|
| A | 0 | 1 | . |
| B | 1 | 1 | . |
| C | 0 | 0 | . |
| . | . | . | . |
| . | . | . | . |

In this table "0" may represent that the designated fiber is not occupied by the designated wavelength and "1" may represent that the fiber is occupied by the designated wavelength. The most preferred fiber 14 with an available wavelength is selected, and central processor 54 sends a command back to the first switching element to transmit the signal to the predetermined port 500. The predetermined port 500 receives the signal and retransmits the signal, step 614, to the appropriate switching element, e.g., 26C, that will be able to send the signal towards the desired destination. In addition, port 500 is capable of converting the wavelength of the received signal to a second wavelength, time shifting transmission of the signal and/or multiplexing a number of received signals having different wavelengths. The signal can then be transmitted to a second switching element capable of handling that wavelength. The process can then repeat itself, as necessary, at step 616.

If no combination of carrier and wavelength is available at step 618, the signal is sent back to the first switching element, which indicates to the first switching element to buffer the incoming signal. Thereafter, central processor 54 periodically checks for availability of a suitable carrier/wavelength combination and commands the first switching element to transmit either to a carrier 14 or a port 500, as appropriate. The above-described process reduces central processor 54 load by delegating certain functions to ports 500.

CONCLUSION

Although the description above contains many specifications, these should not be construed as limiting the scope of the invention but as merely providing illustrations of some of presently preferred embodiments of this invention. Thus, the scope of the invention should be determined by the appended claims and their legal equivalents rather than by the examples given.

What is claimed is:

1. An optical signal altering device, comprising:
    (A) a plurality of optical signal carriers including at least one source and at least one target, each carrier adapted to communicate an optical signal;
    (B) a plurality of switch elements, each switch element adapted to receive an optical signal from a source and transmit the optical signal to a target; and
    (C) at least one port positioned to receive optical signals from and transmit optical signals to at least one switch element, the port being adapted to receive an optical signal having a first wavelength and transmit the optical signal having a second wavelength.

2. The optical signal altering device of claim 1 wherein the port is adapted to receive a plurality of optical signals having a range of wavelengths from a plurality of switch elements and transmit a wavelength multiplexed optical signal.

3. The optical signal altering device of claim 2 wherein the port is adapted to receive the plurality of optical signals over a period of time and transmit a time-multiplexed optical signal.

4. The optical signal altering device of claim 1 wherein the port is adapted to receive a plurality of optical signals from a plurality of switch elements over a period of time and transmit a time-multiplexed optical signal.

5. The optical signal altering device of claim 1 wherein the port comprises:
    (A) a detector adapted to receive an optical signal;
    (B) an amplifier and a driver; and
    (C) an emitter coupled to the amplifier and the driver for transmitting an optical signal.

6. The optical signal detecting device of claim 5 wherein the emitter transmits the optical signal at a set wavelength.

7. The optical signal altering device of claim 5 wherein the emitter is tunable relative to wavelength.

8. The optical signal altering device of claim 5 further comprising a beam splitter for directing the optical signal to the detector.

9. The optical signal altering device of claim 8 wherein the detector is positioned on a reflective side of the beam splitter and the emitter on a transmissive side of the beam splitter.

10. The optical signal altering device of claim 9 further comprising a partial wave plate to alter the optical signal for detection by the detector.

11. The optical signal altering device of claim 9 further comprising a polarizer positioned between the beam splitter and the emitter.

12. The optical signal altering device of claim 9 wherein the reflective side of the beam splitter includes a blackened diffuse surface.

13. The optical signal altering device of claim 8 wherein the beam splitter is a polarizing beam splitter.

14. The optical signal altering device of claim 1 wherein each switch element includes:
    (A) at least one detector positioned to receive an optical signal from at least one optical signal carrier, the detector being adapted to detect an optical signal;
    (B) an emitter array positioned to transmit light to at least one target optical signal carrier, the emitter comprising a plurality of emitters, each emitter being adapted to generate an optical signal, wherein an optical signal generated by each emitter is transmitted to at least one of the plurality of optical signal carriers; and
    (C) a switch controller in communication with the detector and the emitter array, the switch controller being adapted to cause the emitter array to generate the detected optical signal.

15. The optical signal altering device of claim 14 further comprising a beam splitter positioned to reflect optical signals to the detector of a first switch element, the beam splitter being adapted to reflect light within a predetermined range of wavelengths and allow light outside of the predetermined range of wavelengths to pass through the beam splitter, a second switch element being positioned to receive optical signals that pass through the beam splitter and transmit optical signals to the plurality of optical signal carriers.

16. The optical signal altering device of claim 14 further comprising a central processor, the central processor being in communication with the switch controller, the central processor providing information to the switch controller.

17. The optical signal altering device of claim 14 wherein the detector of the switch element is adapted to simultaneously receive a plurality of signals in the same wavelength.

18. The optical signal altering device of claim 1 further comprising a plurality of ports.

* * * * *